US006299733B1

(12) United States Patent
Graf et al.

(10) Patent No.: US 6,299,733 B1
(45) Date of Patent: Oct. 9, 2001

(54) ROLL WITH COMPOSITE MATERIAL ROLL SHELL AND HEAD IN A PAPER-MAKING MACHINE

(75) Inventors: Edwin X. Graf, Menasha; William Witte, Kaukauna, both of WI (US); Douglas H. Angel, Concord, NC (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/589,899

(22) Filed: Jun. 7, 2000

(51) Int. Cl.[7] .............................. D21F 7/00; F16C 13/00
(52) U.S. Cl. .................... 162/272; 492/49; 492/53
(58) Field of Search ............................ 162/358.1, 358.2, 162/358.3, 358.4, 358.5, 359.1, 306, 314, 361, 362, 368, 372, 396, 265, 374, 272; 29/130, 132, 895.1; 100/327, 328; 492/49–53, 55, 56

(56) References Cited

U.S. PATENT DOCUMENTS

| 3,593,398 | * | 7/1971 | Hess et al. ............................... 29/132 |
| 4,043,622 | * | 8/1977 | Hotchkiss et al. ..................... 308/208 |
| 4,839,949 | * | 6/1989 | Sobue et al. ............................ 29/132 |
| 4,841,613 | * | 6/1989 | Beery et al. ............................ 29/130 |
| 4,876,875 | * | 10/1989 | Bruggeman et al. ................... 72/199 |
| 5,061,533 | * | 10/1991 | Gomi et al. ........................... 428/36.3 |
| 5,096,734 | * | 3/1992 | Nikulainen et al. ..................... 427/8 |
| 5,324,248 | * | 6/1994 | Quigley .................................. 492/50 |
| 5,547,448 | * | 8/1996 | Robertson .............................. 492/16 |

* cited by examiner

Primary Examiner—Dean T. Nguyen
Assistant Examiner—Eric Hug
(74) Attorney, Agent, or Firm—Taylor & Aust, P.C.

(57) ABSTRACT

A paper-making machine includes at least one roll for carrying a fiber web or a belt. At least one of the rolls includes a shell formed from a composite material; a journal comprised of metal; and a head interposed between and interconnecting the shell and the journal. The head is also formed from a composite material.

19 Claims, 2 Drawing Sheets

ROLL WITH COMPOSITE MATERIAL ROLL SHELL AND HEAD IN A PAPER-MAKING MACHINE

BACKGROUND OF THE INVENTION

1. Field of the invention

The present invention relates to paper-making machines, and, more particularly, to rolls for use in paper-making machines.

2. Description of the related Art

A paper-making machine is used to form a fiber web, such as a paper web, from a prepared fiber suspension. Typically, the fiber suspension is discharged from a head box onto an endless belt such as a forming fabric with a known cross-sectional profile. A plurality of rolls carry the fiber web from one end of the paper-making machine to the other. The rolls may either directly carry the fiber web, or may indirectly carry the fiber web on an endless belt.

It is known to form a roll in a paper-making machine with a shell which is formed from a composite material. For example, U.S. patent application Ser. No. 09/512,940, entitled "ROLL FOR PAPER-MAKING MACHINE", assigned to the assignee of the present of the invention, discloses a shell for a roll which is formed from a carbon fiber composite material. Such a roll has the advantages of being light weight and having a relatively low rotational inertia.

With a roll having a composite fiber shell as described above, the shell is typically mounted to a metal head, which in turn is mounted to or integral with a journal carried by bearing assemblies at opposite ends of the roll. Although such a composite fiber roll is a step forward in the art, the metal head is relatively heavy and causes the roll to have a high rotational inertia, which may be undesirable for certain applications. More particularly, a roll may rotate during operation within a paper-making machine at a tangential velocity of approximately 7000 feet per minute. Although the composite fiber shell is relatively light weight, the metal head and. metal journal at each end of the roll cause the roll to have a relatively high rotational inertia.

Moreover, the composite fiber shell has a coefficient of thermal expansion which is typically much less than the coefficient of thermal expansion of the metal head which interconnects the shell with the journal. This results in an expansion differential between the shell and head in the longitudinal direction, which may affect the attachment therebetween. Moreover, thermal stresses may be induced within the shell and/or head, depending upon the temperature expansion differential and the particular attachment technique used therebetween.

What is needed in the art is a roll for a paper-making machine which is light weight, has a low rotational inertia, and is relatively stable when subject to thermal expansions and contractions.

SUMMARY OF THE INVENTION

The present invention provides a roll for use in a paper-making machine which has a shell and a head which are each formed from a composite material with substantially identical thermal expansion properties, with the head being press fit onto a metal journal.

The invention comprises, in one form thereof, a paper-making machine including at least one roll for carrying a fiber web or a belt. At least one of the rolls includes a shell formed from a composite material; a journal comprised of metal; and a head interposed between and interconnecting the shell and the journal. The head is also formed from a composite material.

An advantage of the present invention is that the roll is light weight, thereby having a low rotational inertia during operation.

Another advantage is that the roll is easy and inexpensive to manufacture.

Yet another advantage is that the shell and the head may be attached together using a number of different attachment techniques, such as adhesive bonding.

A further advantage is that the roll head may be press fit or circumferentially wrapped onto the roll journal to rotationally and longitudinally affix the head relative to the journal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
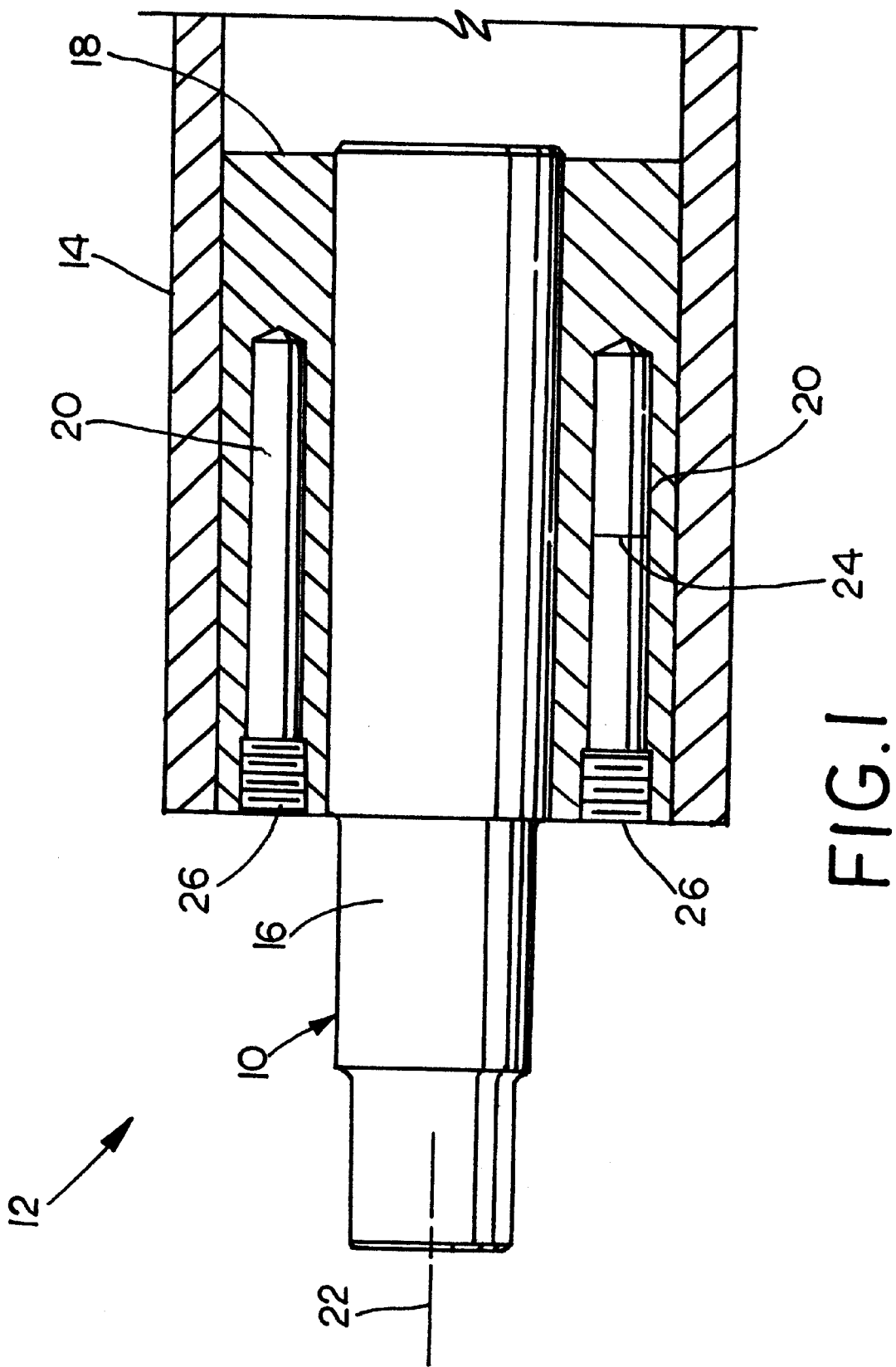
FIG. 1 is a fragmentary, side, sectional view of an embodiment of a roll of the present invention used in a paper-making machine.
Figure 2:
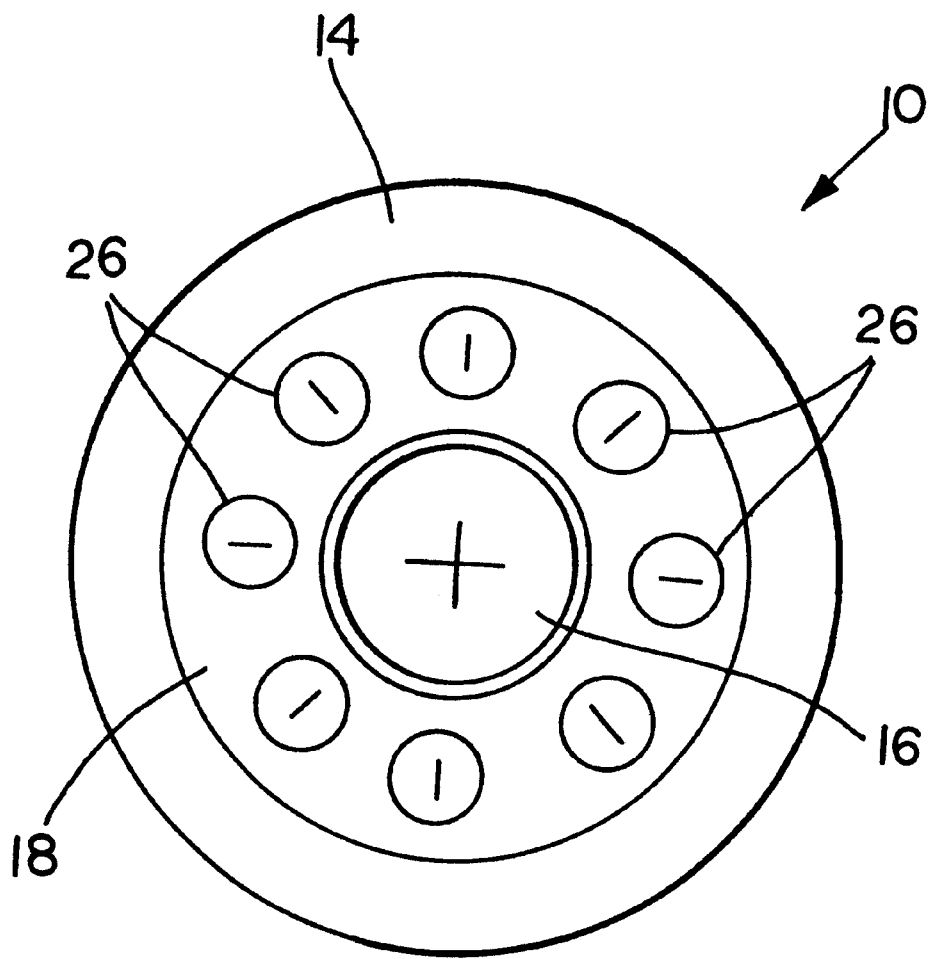
FIG. 2 is an end view of the roll shown in FIG. 1.

Referring now to the drawings, there is shown an embodiment of a roll 10 of the present invention within a paper-making machine 12. Paper-making machine 12 is used for manufacturing a fiber web, such as a paper web, and includes a plurality of rolls for directly or indirectly carrying the fiber web. Only a single roll is shown in FIGS. 1 and 2 for simplicity and ease of description.

Roll 10 generally includes a shell 14, journal 16 and head 18. Shell 14 may have any suitable length, depending upon the width of the fiber web which is manufactured within paper-making machine 12. Only a portion of shell 14 adjacent journal 16 and head 18 is shown in FIG. 1. Shell 14 is constructed from a composite material, such as a carbon fiber composite material. Shell 14 is formed with an outer surface having a texture and shape, depending upon the particular application. For example, shell 14 may have a crowned, roughened, smooth ground and/or coated outer surface, depending upon the particular application. Moreover, an integral or separate rubber, ceramic or metal cover may be placed over shell 14.

Journal 16 extends from each opposite longitudinal end of roll 10, and allows roll 10 to be rotatably carried by a pair of corresponding bearing assemblies (not shown) mounted to a frame within paper-making machine 12. Each journal 16 is formed from metal to provide good rigidity and wear properties. In the embodiment shown, journal 16 is formed from 1045 steel. Other metals may also be utilized, depending upon the particular application.

Head 18 is interposed between and interconnects shell 14 with journal 16. Head 18 is constructed from a composite material having a coefficient of thermal expansion which is approximately the same as shell 14. In the embodiment shown, head 18 is constructed from a carbon fiber composite material and/or fiber glass composite material. By providing shell 14 and head 18 with coefficients of thermal expansion which are approximately equal, the longitudinal and radial expansion of each is approximately the same during operation as roll 10 increases or decreases in temperature. This ensures that an effective bond is maintained between shell 14 and head 18.

Head 18 also includes a plurality of openings 20 which extend in a direction generally parallel to longitudinal axis 22 of journal 16. A weight material 24 may be placed within one or more openings 20 to rotationally balance roll 10 during operation. For example, one or more openings 20 may be partially or entirely filled with a weight material in the form of lead to rotationally balance roll 10. A plurality of plugs 26 are respectively threadingly coupled with each corresponding opening 20 to thereby cover each opening 20.

To assemble roll 10, composite fibers in a resin matrix are wound onto journal 16 to thereby form head 18 and rotationally and longitudinally affix head 18 relative to journal 16. Head 18 is placed within the interior of shell 14 and adhesive bonded therewith adjacent the end of shell 14. Head 18 may also be attached with shell 14 using other attachment techniques, such as with press fitting, fasteners, pins, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the presents disclosure as come within known or customary practice in the art to which this invention pertains and which fall within the limits of the appended claims.

What is claimed is:

1. A paper-making machine, comprising:
   at least one roll for carrying one of a fiber web and a belt,
   at least one of said rolls including:
   a shell comprised of a first composite material, said first composite material having a first coefficient of thermal expansion;
   a journal comprised of metal, said journal having a journal axis; and
   a head interposed between and interconnecting said shell and said journal, said head including a plurality of openings therein, each said opening extending substantially parallel to said journal axis, at least one of said openings have a weight material therewithin, said head comprised of a second composite material, said second composite material having a second coefficient of thermal expansion and said second coefficient of thermal expansion being approximately equal.

2. The paper-making machine of claim 1, wherein said shell is comprised of a carbon fiber composite material.

3. The paper-making machine of claim 1, wherein said journal is comprised of steel.

4. The paper-making machine of claim 1, wherein said head is comprised of a carbon fiber composite material.

5. The paper-making machine of claim 1, wherein said head is comprised of a fiberglass composite material.

6. The paper-making machine of claim 1, wherein said shell is adhesively attached with said head.

7. The paper-making machine of claim 6, wherein said head is press fit to said journal.

8. The paper-making machine of claim 1, including a plurality of plugs respectively covering each said opening.

9. The paper-making machine of claim 8, wherein each said plug is threadingly coupled with each said respective opening.

10. The paper-making machine of claim 1, wherein said weight material comprises lead.

11. A paper-making machine, comprising:
    at least one roll for carrying one of a fiber web and a belt,
    at least one of said rolls including:
    a composite material shell;
    a metal journal said journal having a journal axis; and
    a composite material head interposed between and interconnecting said shell and said journal, said head including a plurality of openings therein, each said opening extending substantially parallel to said journal axis, at least one of said openings having a weight material therewithin.

12. The paper-making machine of claim 11, including a plurality of plugs respectively covering each said opening.

13. A roll for use in a paper-making machine, comprising:
    a shell comprised of a first composite material, said first composite material having a first coefficient of thermal expansion
    a journal comprised of metal, said journal having a journal axis; and
    a head interposed between and interconnecting said shell and said journal, said head including a plurality of openings therein, each said opening extending substantially parallel to said journal axis, at least one of said openings have a weight material therewithin, said head comprised of a second composite material, said second composite having a second coefficient of thermal expansion, said first coefficient of thermal expansion and said second coefficient of thermal expansion being approximately equal.

14. The roll of claim 13 wherein said shell is comprised of a carbon fiber composite material.

15. The roll of claim 13, wherein said journal is comprised of steel.

16. The roll of claim 13, wherein said head is comprised of one of a carbon fiber composite material and a fiberglass composite material.

17. The roll of claim 13, wherein said shell is adhesively attached with said head.

18. The roll of claim 17, wherein said head is press fit to said journal.

19. The roll of claim 13, including a plurality of plugs respectively covering each said opening.

* * * * *